May 19, 1964  F. B. STENCEL  3,133,718
AUTOMATICALLY PROJECTED AND DEPLOYED PARACHUTE
Original Filed April 30, 1956  2 Sheets-Sheet 1
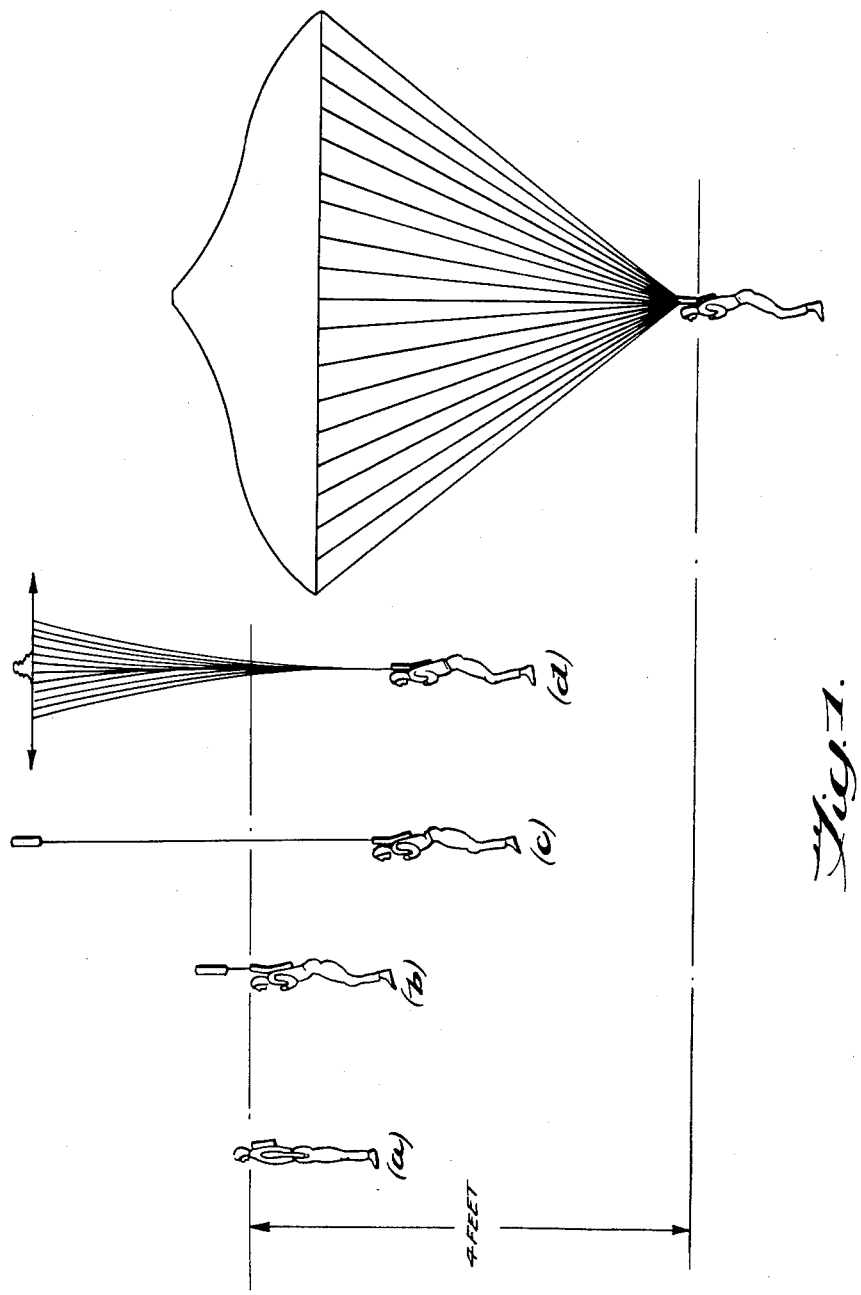

May 19, 1964 F. B. STENCEL 3,133,718
AUTOMATICALLY PROJECTED AND DEPLOYED PARACHUTE
Original Filed April 30, 1956 2 Sheets-Sheet 2
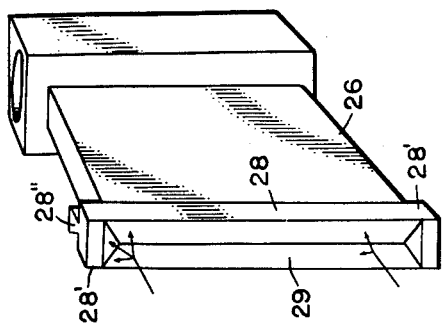
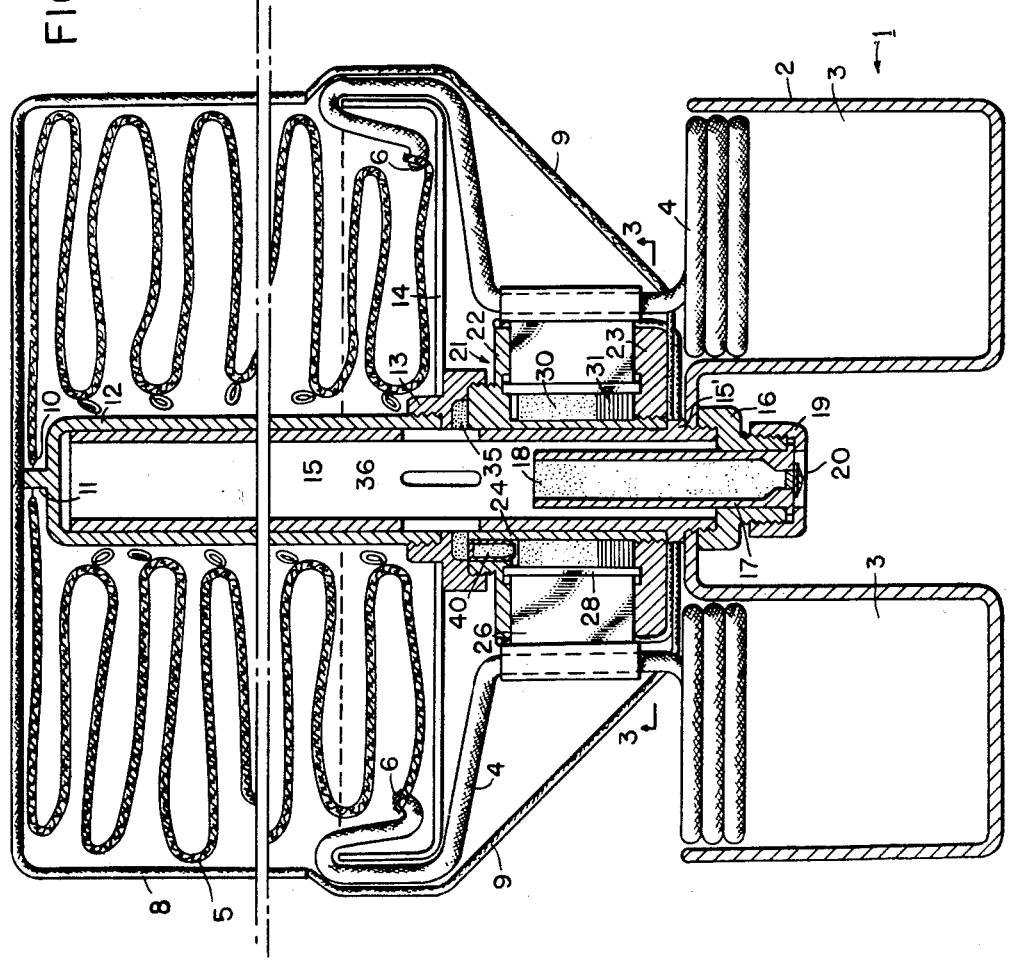

United States Patent Office

3,133,718
Patented May 19, 1964

3,133,718
AUTOMATICALLY PROJECTED AND DEPLOYED PARACHUTE
Fred B. Stencel, Buncombe County, N.C., assignor, by mesne assignments, to Celanese Corporation of America, New York, N.Y., a corporation of Delaware
Continuation of abandoned application Ser. No. 581,535, Apr. 30, 1956. This application Dec. 1, 1960, Ser. No. 72,922
10 Claims. (Cl. 244—147)

This invention relates to an automatically projected and deployed parachute and more particularly to a parachute which is explosively projected and deployed through mechanism carried by the parachute and in a very short period of time.

Many aircraft are now being built which are intended to take-off and land in a vertical direction, the so-called VTO's. These aircraft depend, in the first stage of take-off, completely on the vertical thrust of a jet engine or of propellers or rotors of very high disc loading. Such propulsion means are subject to failure, and, in the case of such failure, the pilot and other personnel of the VTO must parachute therefrom and the aircraft will crash. However, after a VTO has ascended to the height on the order of 10 ft., and before it has reached an altitude that assures safe parachuting, a height on the order of at least 1000 ft., the use of the conventional parachute for return of the aircraft or personnel to the ground is extremely dangerous and may well result in complete destruction of the aircraft and loss of life. This is because parachuting at zero air speed requires a free fall until sufficient relative velocity is built up to allow the air flow to project and deploy the parachute canopy.

In the past, several different proposals have been made to provide for automatic projection of parachutes. For instance, it has been suggested that the parachute be projected upwardly with respect to the harness carrying the load by explosive means, or by spring pressure. It has also been suggested that the canopy be deployed or unfurled by propelling the suspending lines radially outwardly through the use of springs. None of these suggestions, however, solves the problem presented above, and, as far as is known, these suggestions have not been used extensively.

The apparatus of the present invention is designed to project and deploy a parachute canopy within a very short period of time, of the order of one-half second. This allows safe return to the ground of the aircraft and personnel of a VTO which has failed at a very small height. The invention includes means for explosively projecting the canopy and suspension lines upwardly with respect to the harness and after a time delay sufficient to insure the canopy reaching a proper height, explosively propelling the suspension lines outwardly to deploy the canopy. It is noted that spring action would not react sufficiently fast to produce the result that can be obtained by the explosive means of this invention. Further, it is extremely important that sufficient time between the beginning of projection and the beginning of deployment be available so that the pack is spaced above the load by nearly the entire length of the suspension lines before deployment begins.

The invention will now be more fully described in conjunction with drawings showing a preferred embodiment of the invention. In the drawings, FIG. 1 is a diagrammatic showing of the various stages of the projection and deployment of a parachute by the apparatus of the present invention;

FIG. 2 is a vertical sectional view with parts shown in elevation, through a preferred embodiment of the invention;

FIG. 3 is a half sectional view taken on line 3—3 of FIG. 2, with the lower wall of the ejector removed; and FIG. 4 is a perspective view of an assembly of one of the slugs and one of the shear pins of the ejector.

Referring first to FIG. 1, the apparatus of the present invention is designed to project and deploy a parachute canopy within a very short interval of time, representing a free fall of the load through a distance, from rest, of as little as four feet. At (a) of FIG. 1, the parachutist has started his fall and the automatic projection and deployment apparatus of the invention has just been actuated. The pack is then ejected or projected upwardly, taking a position a fraction of a second later as shown at (b). At (c) the pack has reached nearly its maximum vertical spacing from the parachutist, and deployment of the canopy is about to start. At (d) the canopy has begun its spread, and at (e) the canopy is fully deployed and has its maximum effectiveness. The parachute then slows the descent of the load such that a parachutist may descend safely to reach the ground after a fall from the position at (c) only of the order of a few feet.

In the apparatus of the invention, referring to FIGS. 2, 3 and 4, the parachute harness or base structure is indicated generally at 1, without any showing of the usual straps for mounting the parachute on the load. The apparatus of the invention could even be used to support an airplane, e.g., a VTO which has experienced a power failure. Hence, the term "load" is used herein to cover not only human beings, but also cargo and even a complete airplane. The harness or base structure includes a tray-like member 2, rectangular in plan and having a pair of deep chambers 3 designed to carry the folded suspension lines 4. The upper ends of the suspension lines are attached to the periphery of the canopy 5, as at 6. The other ends of the suspension lines (not shown) will be attached to the harness or base structure.

The canopy 5 is carried by a canvas container or cover 8 having retaining lines or loops 9 of cord material attached thereto adjacent its lower edge. The canopy itself is folded into a toroid-like form in cross-section with primary folds as shown in schematic form in FIG. 2 and with secondary triangular folds within each individual primary fold (not shown). The method of folding to obtain this configuration is disclosed in my copending application Serial No. 581,764 filed April 30, 1956 now Patent No. 2,936,138.

The central portion or apex of the canopy 5 carries a ring 10 through which a pin 11 forming an extension of the upper end of cylindrical tube 12 extends. The tube 12 is very long in comparison with its diameter and has its end adjacent pin 11 closed, while its opposite end is open. As will be later explained, the tube 12 constitutes a projectile by means of which the cover or container 8 and the canopy 5 are projected from the base structure 1.

A nut-like coupling member 13 is threaded to the lower end of tube 12 and carries a tray-like member 14 which supports the cover and canopy and forms a closure for the open end of the cover.

An inner cylindrical tube or member 15, of length greater than that of number 12, telescopes within the outer member 12 and is open at its uppermost end, this end being closed by the upper end wall of tube 12. The remote end of cylindrical member 15 is threaded onto member 2 and has a flange 15' which bears against the upper side of the member. A coupling member 16 is internally threaded at its upper end to engage with the threads of cylindrical member 15 and bear against the lower side of tray-like member 2. A cylindrical sleeve 17 projects into the internal chamber of inner member 15 and carries a powder charge 18 designed for explosive projection of the canopy and suspension lines. The sleeve 17 is pressed against the lower end of coupling member 16 by a nut 19 which is threaded onto the lower end of the coupling member. The sleeve carries, at its lower end, a primer cap 20, which may be operated by any suitable means (not shown).

Since the cylindrical member 15 is closed at its lower end and closed at its upper end only by the upper end wall of cylindrical member 12, ignition of the powder charge 18 by operation of the primer cap will generate a high pressure within the inner chamber of member 15 to project the outer cylindrical member 12 and the canopy attached thereto upwardly with great force. Since the suspension lines 4 are attached to the periphery of the canopy, they will also be projected upwardly with the canopy and be payed out from support 2.

Outer cylindrical member 12 also carries, at its lower end through engagement with coupling member 13, a deployment means 21 having upper and lower walls 22 and 23 and an axially extending cylindrical wall 24 joining the upper and lower walls. The lower wall 23 is threaded to wall 24 and therefore removable. The upper wall carries a plurality of downwardly extending partitions 25 of wedge shape in plan, as shown in FIG. 3, which divide the space defined by the ejector walls into a plurality of arcuately spaced chambers of rectangular tranverse cross-section. A corresponding plurality of deployment projectiles or slugs 26 are positioned within these chambers, the slugs being T-shaped in elevation and having a shank which is of a rectangular traverse cross-section. The slugs 26 are each provided with a bore 27 extending axially through its head that is generally parallel to the axis of member 12, said bores being of diameter corresponding to the diameter of the suspension lines, to permit the suspension lines to be received and threaded through the bores. The lines may be held against slipping through the bores of the slugs by any appropriate means (not shown).

The slugs 26 are retained within the deployment means 21 by means of shear pins 28 which carry extensions 28' at their opposite ends to fit into slots in the axially-spaced upper and lower walls of the deployment means, one shear pin for each slug. The shear pins fit loosely into the chambers of the ejector and are each bevelled at their inner sides, at the ends and sides, to provide depressions 29 whose purpose will shortly be explained. The slugs, as shown in FIG. 3, have slots at their inner ends into which keys 28" of the shear pins fit. The shear pins are of such fragile nature and of such dimensions that their extensions 28' are sheared by high pressure, to permit the slugs to be propelled outwardly of the deployment means, but the pins hold the slugs within the ejector until they are sheared.

An explosive powder charge 30 is mounted in the annular space in deployment means 21 inwardly of shear pins 28 and is held in place by wadding 31 to force its upper end against the lower side of the upper wall 22 of the ejector. It will be evident that ignition of explosive powder charge 30 will generate extremely high pressures in the deployment means. At the first instant of generation of these pressures, forces in the directions of the arrows of FIG. 4 will be exerted on the bevelled sides of depression 29 of each pin to distort the pins into scaling engagement with the chamber walls formed by upper and lower walls 22 and 23 and partitions 25. The pressure will then shear off extensions 28' of the pins and propel the slugs 26 out of the deployment means at high speed, thus carrying the suspension lines and the canopy radially outwardly.

The powder charge 30 is ignited after a time delay from the ignition of powder charge 18 sufficient to insure adequate projection of the canopy and suspension lines, in other words, ascent of the canopy to such a height with respect to the harness that the suspension lines are stretched to nearly their entire length and are payed out of the chamber 3 of the harness. This time delay actuation is accomplished through provision of a transfer charge 35 which is positioned adjacent the upper end of the deployment means between the ejector and coupling member 15 and which has access to the inner chamber of inner cylindrical member 15 through a series of arcuately-spaced slots 36 in that member. Slots 36 are positioned closely adjacent the upper end of explosive charge 17, so that flames from the explosive charge when it is ignited project through slots 36 to ignite transfer charge 35. The end of transfer charge 35 remote from slots 36 contacts the upper end of a time delay fuse 40 which is mounted within the ejector. The time delay fuse has its lower end adjacent the upper end of explosive charge 30. The characteristics of the fuse are such that nearly full projection is permitted before ignition of charge 30 to cause deployment of the canopy.

In assembling the apparatus of the invention, the canopy is first folded and placed in the canvas conveyor 8, in the manner disclosed in my aforesaid copending application. The assemblies of shear pins and slugs are placed in the deployment means with the lower wall 23 removed and the lower wall is then threaded onto the lower end of member 24 of the deployment means. With the shear pins and slugs in place, the pack is placed on tray 14 and the loops 9 of the cover are slipped over the underside of the deployment means and positioned with their ends on the upper sides of plugs remote from their points of attachment to the cover, as shown in FIG. 2. The suspension lines 4 are then threaded through the bores 27 in the appropriate slugs 26, and the suspension lines are folded into the chambers 3. The assembly comprising the pack, the deployment means and outer tube 12 is then connected to the base structure and firing assembly by sliding tube 12 over inner member 15. The parachute is then ready for use.

When it is necessary to parachute, primer cap 20 is actuated to ignite projection-explosive charge 18. Ignition of charge 18 generates high pressure within the internal chamber of inner cylindrical member 15 to propel the outer cylindrical member and the canopy and suspension lines suspended therefrom upwardly at great speed. At the same time, the flames from explosive charge 18 project through slots 36 to ignite transfer charge 35, and the transfer charge causes the time delay fuse 40 to begin burning. The outer cylindrical member 12 and the suspension lines associated therewith, as well as the deployment means 21 carried thereby, ascend with respect to the harness and inner cylnidrical member 15 to such a height that the suspension lines are nearly fully payed out and nearly full projection has been had. By that time, the time delay fuse has burned to such a point that it ignites explosive-deployment charge 30. The deployment charge ignites and shears pins 28 and propels slugs 26 outwardly of the ejector at great speed, thus driving the suspension lines radially outwardly to deploy the canopy. When the canopy is fully deployed, of course, safe, slow descent is insured by the usual parachute action.

As indicated above, the slugs 26 are preferably of rectangular cross-section, though they may be cylindrical. Cylindrical slugs, however, require a larger arcuate dimesion than rectangular slugs for a given mass, and yield a poor power loading. (Power loading is the ratio of area on which pressure acts to the weight of the slug.) Therefore, in good to obtain the smallest possible size of the ejector with good power loading, it is preferred that rectangular slugs be used.

It has been found that use of the present invention will permit full projection and full deployment of a parachute canopy within a time on the order of one-half second. Since this represents a free fall of a distance of the nature of four feet, it is evident that the parachute can be operated at a speed such as to prevent injury to equipment or personnel even though descent is from a small distance above the ground.

The present invention has been described in conjunction with a preferred embodiment thereof. It will be evident that many minor changes could be made in details of the invention without departing from the scope thereof. For instance, it is not necessary that the explosive projection charge 18 actuate the explosive deployment charge 30 through a powder train, but rather, ignition of the deployment charge could be effected through a rip cord of somewhat shorter length than the suspension lines which activated a firing pin when the rip cord was stretched. The important thing is that both projection and deployment be explosive in order to obtain the high speed of deployment associated therewith, and that there be a time delay between projection beginning and the beginning of deployment, to permit the canopy and suspension lines to rise to the proper distance above the harness.

This is a continuation of my copending application Serial No. 581,535 filed April 30, 1956, now abandoned.

The invention is not to be considered limited by the embodiments specifically disclosed, but rather only by the appended claims.

I claim:

1. A deployable parachute, comprising a collapsed parachute canopy; a plurality of suspension lines attached to the periphery of said canopy, and adapted to be attached to a load; a first explosive means independent of the launching source having a first and second member, said first member attached to said canopy and said second member attached to said load, said first explosive means adapted to extend the suspension lines, and to diverge said first member and said canopy from said second member and said load; second explosive means independent of said launching source attached to said parachute at points adjacent the periphery of said canopy, adapted to open and deploy said canopy to a load supporting condition; and means for actuating said second explosive means as the canopy and the load approach their maximum divergence.

2. The deployable parachute of claim 1 wherein said first member and said second member are telescopically and slidably engaged.

3. The deployable parachute defined in claim 1 further including means for retaining said canopy in a collapsed condition until said canopy is deployed radially outward.

4. A deployable parachute comprising a collapsed parachute canopy, a plurality of suspension lines attached to the periphery of said canopy, and adapted to be attached to a load; a first explosive means having a first and second member, said first member attached to said canopy, and said second member attached to said load, said first explosive means adapted to extend the suspension lines, and to diverge said first member and said canopy from said second member and said load; second explosive means attached to the suspension lines at points adjacent said canopy, adapted to open and deploy said canopy to a load supporting condition, and means for actuating said second explosive means as the canopy and the load approach their maximum divergence.

5. The deployable parachute defined in claim 4, wherein said second member comprises a hollow member defining a central chamber containing a first explosive charge and said first member comprises a projectile member, and said projectile member communicates with said central chamber, and said first and second members are operatively associated to diverge said projectile member and the attached canopy from said hollow member and said load, upon actuation of said first explosive means.

6. The deployable parachute defined in claim 5 wherein said first explosive means is disposed centrally of said collapsed parachute canopy with the apex of the canopy atached to one end of said projectile member, said first and second members of said first explosive means are telescopically and slidably engaged, and said second explosive means are carried by said projectile member.

7. The deployable parachute defined in claim 5 wherein said second explosive means comprise a second explosive charge disposed centrally of said collapsed parachute canopy, a plurality of elements each attached to a different one of said suspension lines at a point adjacent said canopy, said elements being positioned radially with respect to said second explosive charge and operatively associated therewith to be projected radially outward by said explosive charge to deploy said suspension lines and the canopy radially outward.

8. The deployable parachute defined in claim 7 wherein said means for actuating said second explosive means comprises fuse means communicating with said central chamber and extending to said second explosive charge, said fuse means being ignited by the explosion of said first charge and in turn igniting said second explosive charge.

9. The deployable parachute defined in claim 5 wherein said second explosive means comprise means defining a chamber disposed centrally of said folded parachute and adapted to receive a second explosive charge, said chamber defining means comprising an outer wall having formed therein a plurality of openings communicating with said chamber directed radially outward with respect to said chamber and a plurality of deployment projectiles each operatively disposed in a different one of said openings for outward projection radially of said chamber and said projectile member upon explosion of said second explosive charge, each of said deployment projectiles being attached to a different one of said suspension lines at a point adjacent said canopy.

10. A deployable parachute, comprising a collapsed parachute canopy; a plurality of suspension lines attached to the periphery of said canopy, and adapted to be attached to a load; a first explosive means having a first and second memebr, said first member attached to said canopy and said second member attached to said load, said second member comprising a hollow member defining a central chamber containing a first explosive charge, said first member comprising a projectile member, said projectile member communicating with said central chamber, said first explosive means being disposed centrally of said collapsed parachute canopy with the apex of the canopy attached to one end of said projectile member, said first and second members of said first explosive means being telescopically and slidably engaged, and said first and second members being operatively associated to extend the suspension lines and to diverge said projectile member and the attached canopy from said hollow member and said load, upon actuation of said first explosive means; a second explosive means, carried by said projectile member, comprising a second explosive charge disposed centrally of said collapsed parachute canopy, a plurality of elements each attached to a different one of said suspension lines at a point adjacent said canopy, said elements being positioned radially with respect to said second explosive charge and operatively associated therewith to be projected radially outward by said explosive charge to deploy said suspension lines and the canopy radially outward to a load supporting condition; and means for actuating said second explosive means as the canopy and the load approach their maximum divergence.

References Cited in the file of this patent

UNITED STATES PATENTS

| 1,081,137 | Von Augezd | Dec. 9, 1913 |

FOREIGN PATENTS

| 16,745 | France | Jan. 30, 1913 |
| 425,222 | France | Mar. 31, 1911 |
| 436,529 | France | Jan. 25, 1912 |
| 19,059 | Great Britain | 1913 |
| 133,924 | Austria | June 26, 1933 |